United States Patent [19]

Oltman et al.

[11] Patent Number: 4,687,714
[45] Date of Patent: Aug. 18, 1987

[54] CASE FOR METAL/AIR ELECTROCHEMICAL CELLS, AND CELLS AND LANTERN BATTERIES THEREOF

[75] Inventors: John E. Oltman, Mt. Horeb; Gerald F. Sanden, Verona, both of Wis.

[73] Assignee: Rayovac Corporation, Madison, Wis.

[21] Appl. No.: 826,130

[22] Filed: Feb. 4, 1986

[51] Int. Cl.⁴ .......................................... H01M 12/04
[52] U.S. Cl. ...................................... 429/27; 429/66
[58] Field of Search .......................... 429/27, 66, 174; 362/157

[56] References Cited

U.S. PATENT DOCUMENTS

| 2,768,229 | 10/1956 | Herbert | 429/174 |
| 3,415,685 | 12/1968 | Hansen | 429/27 |
| 3,855,000 | 12/1974 | Jammet | 429/66 |
| 4,224,385 | 9/1980 | Ciliberti et al. | 429/66 |

FOREIGN PATENT DOCUMENTS 1319780  6/1973  United Kingdom ................. 429/27

Primary Examiner—Donald L. Walton
Attorney, Agent, or Firm—Kenyon & Kenyon

[57] ABSTRACT

A case for enclosing a metal anode, air cathode, and electrolyte of a metal/air electrochemical cell is prepared by securing a multi-functional metallic cover, which has means for providing ingress of oxygen to the air cathode, to a non-conductive container. The container is capable of expanding to accomodate the growth of anodic material during discharge, while the cover is capable of supporting the air cathode against distortion on discharge and serving as the positive terminal of the cell. Metal/air cells and batteries constructed with such a case are also described.

25 Claims, 5 Drawing Figures

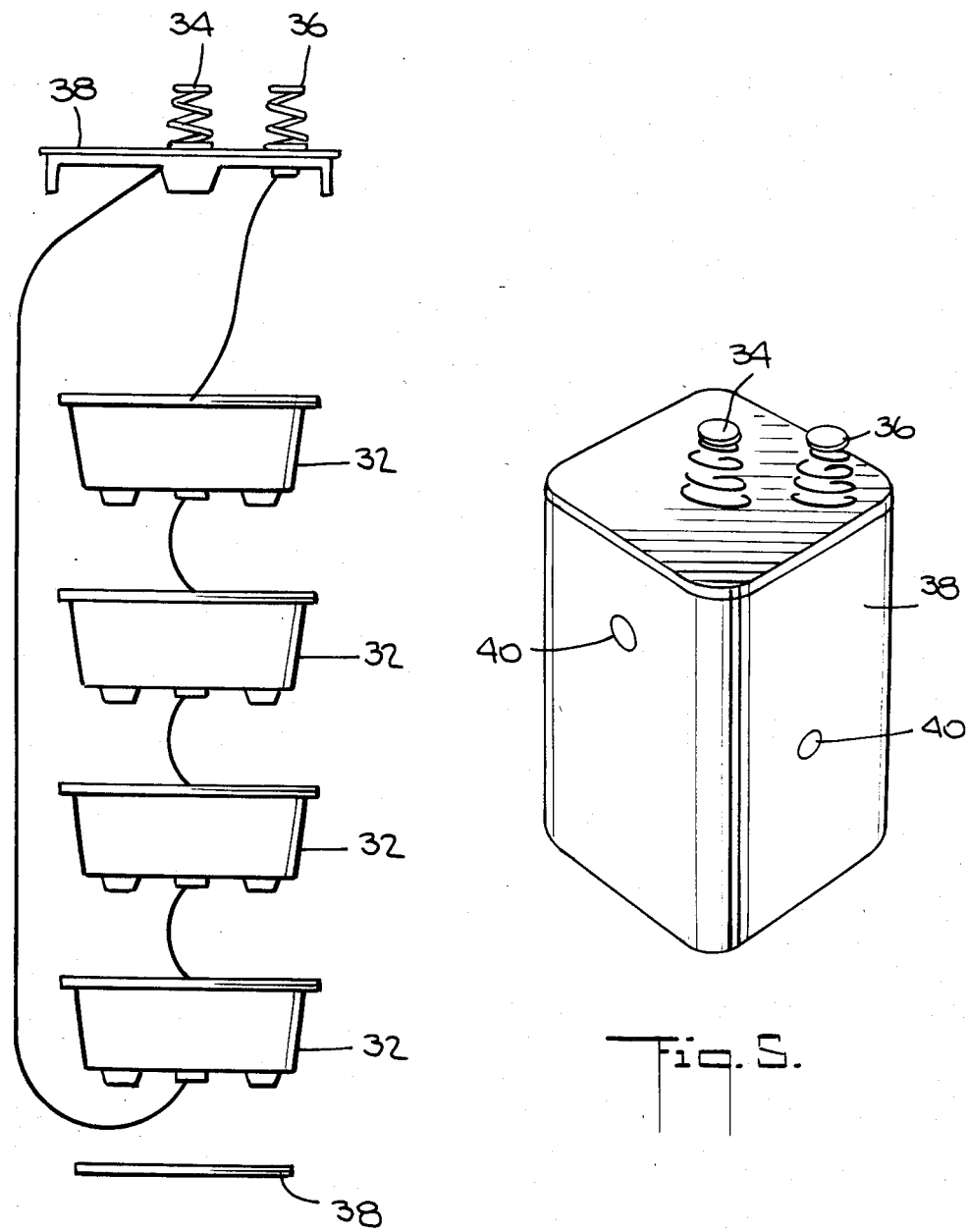

CASE FOR METAL/AIR ELECTROCHEMICAL CELLS, AND CELLS AND LANTERN BATTERIES THEREOF

FIELD OF INVENTION

This invention pertains to a case for enclosing a metal anode, air cathode, and electrolyte of a metal/air electrochemical cell. The invention also relates to metal/air electrochemical cells, and batteries manufactured with such a case, which are adapted for use in consumer and industrial lighting applications.

BACKGROUND OF INVENTION

Metal/air electrochemical cells, such as zinc/air cells, and batteries constructed with such cells, exhibit several advantageous characteristics suggesting their potential use in lighting applications in which relatively low operating voltages are required for extended periods of time. Air cathodes, which employ an essentially unlimited reactant source (the atmosphere) are not consumed during discharge and are of low weight. Additionally, metal/air systems exhibit high discharge capacities.

To date, however, the metal/air system has been limited to military batteries and button cells, i.e., watch, calculator and hearing-aid cells. Past attempts to fabricate a metal/air cell for other applications have failed due to the lack of a cell design which was leak resistent, stable towards environmental effects, and yet of adequate rate capability for other applications, such as typical lantern drains. Additionally, prior metal/air cells have not been capable of accommodating the growth of anodic material during discharge, while at the same time being inexpensive enough to manufacture and capable of sufficient design flexibility to be commercially viable.

The chief problems and limitations associated with metal/air battery systems stem at least in part from the same factor which provides for their advantages: interaction with the environment. For example, the loss or gain of water in the cell as a result of environmental humidity changes has been a significant design consideration. Additionally, a metal/air cell must be designed to accommodate the increase in the volume of anodic material that occurs during discharge. For instance, in a zinc/air cell, the oxidation of zinc to zinc oxide during cell discharge can cause an increase in volume of about 17%. The internal pressure created by this increase in cell volume often causes such cells to leak. Additionally, this expansion of anodic material introduces the risk of short circuit by contact between the positive and negative electrodes.

It is known in the art to provide compressible means within the cell to absorb expansion of the anodic material during discharge. Such an arrangement is for instance described by Jammet, U.S. Pat. No. 3,855,000. This teaching, however, exacerbates one known disadvantage—a larger and more expensive cell design is required to accommodate the compressible means. Additionally, inclusion of the compressible means imposes certain design constraints which limit the applicable uses of the cell.

It has also been proposed to provide free space inside the cell in order to permit expansion of the anodic material during discharge. However, when the individual anode particles, which are often initially suspended in a gelled alkaline solution, expand freely into the void space, they may not remain in physical contact with one another, resulting in incomplete cell discharge. Additionally, if the cell is not sealed tightly, the anode may be directly oxidized by oxygen from the atmosphere. As a result, the performance capacity of the cell will be reduced. It has also been suggested that the discharge of the cell may be effected by shifting of the active anodic material within the free space.

Furthermore, if a large amount of free space is required in order to permit adequate expansion, a larger, more expensive battery must be constructed. For instance, because the cell casings of zinc/air button cells are conventionally constructed of rigid, metallic materials, which are not capable of expanding to accomodate the growth of anodic material during discharge, such cells typically require an initial void space of 17%.

Accordingly, it is an object of the present invention to provide a cell case for use in manufacturing a metal/air electrochemical cell which is suitable for consumer and industrial lighting applications, is capable of accomodating the expansion of anodic material during discharge, possesses a reduced amount of void space, and produces more power than traditional cells.

It is another object to provide a cell case for use in manufacturing a metal/air electrochemical cell which is leak resistant, stable towards environmental effects, and has an adequate rate capability for typical lantern drains.

It is another object to provide a cell case for use in manufacturing a metal/air electrochemical cell which has a smaller uncomplicated structure, is inexpensive to manufacture, and is easily fabricated in a wide variety of designs suitable for diverse applications.

It is another object to provide a metal/air electrochemical cell and battery manufactured with such a case.

These objects and other subsidiary objects which will be apparent to those skilled in the art are achieved by the practice of the present invention.

SUMMARY OF THE INVENTION

The present invention provides a case for enclosing a metal anode, air cathode, and electrolyte of a metal/air electrochemical cell, comprised of a nonconductive container which is capable of expanding to accomodate the growth of anodic material during discharge, and a multi-functional metallic cover, secured to the container, which has means for providing ingress of oxygen to air cathode, the cover also being capable of supporting the air cathode against distortion during discharge and functioning as the positive terminal of the cell.

The invention also provides a metal/air electrochemical cell manufactured with such a case, and additionally comprised of a metal anode, an air cathode, and electrolyte disposed in the case, the anode and cathode being separated to prevent shorting of the cell, and the cover being superposed on, and in electrical contact with the air cathode. Additionally, the present invention provides a metal/air battery comprised of at least one cell according to the invention, and a housing in which the cell is contained, the housing having means for providing ingress of oxygen to the air cathode.

BRIEF DESCRIPTION OF THE DRAWINGS

The foregoing and other objects, characteristics, and advantages of the present invention will be more clearly understood from the following detailed description thereof when read in connection with the accompanying drawings, in which:

FIG. 4 is a schematic elevational view of the metal/air battery of the invention, shown here comprising four stacked cells electrically connected in series to each other and to the terminals of the battery housing.

FIG. 5 is a perspective view of a battery/housing comprising the metal/air battery of the invention.

DETAILED DESCRIPTION OF THE INVENTION

Figure 1:
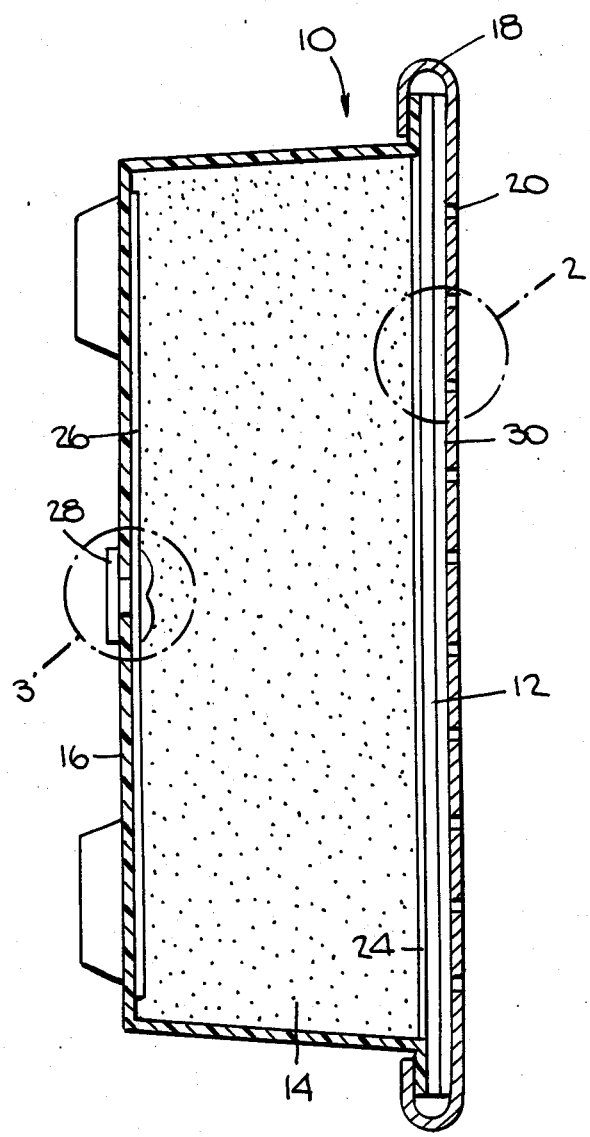
FIG. 1 is a cross-sectional view of the cell case, and metal/air electrochemical cell of the invention.

While the invention is susceptible to various modifications and alternative forms, there is shown in the drawings and will herein be described in detail, the preferred embodiments. It is to be understood, however, that it is not intended to limit the invention to the specific forms disclosed. On the contrary, the applicants intend to cover all modifications and alternative forms falling within the spirit and scope of the invention. For example, while the present invention will be particularly described in connection with zinc/air cells, it should be appreciated that the invention is equally applicable to other metal/air cells.

In general, the present invention is predicated on the discovery that a metal/air electrochemical cell can be provided which exhibits superior electrical performance in comparison to traditional cells of the same or larger size, and yet is capable of accommodating the growth of anodic material during discharge without leakage. The cell can also be manufactured easily and inexpensively. This is achieved by employing a cell case for enclosing the metal anode, air cathode, and electrolyte of the cell, which comprises a nonconductive container and a multi-functional metallic cover. As described in further detail below, the container is capable of expanding to accommodate the growth of anodic material during discharge while the cover performs the multiple functions of providing means for furnishing ingress of oxygen to the air cathode, supporting the air cathode against distortion on discharge and operating as the positive terminal for the cell. The design of the cell is simplified through the use of the multi-functional cover, which eliminates the need for additional structural elements so that enhanced production on a commercial scale is possible.

Turning now the FIG. 1, there is shown a view of the cell case and metal/air electrochemical cell of the invention. As illustrated, the case 10 encloses the air cathode 12, metal anode, and electrolyte of the cell. (In FIG. 1, the anode and electrolyte are depicted as a mixture 14). The case is comprised of a nonconductive container 16 and a metallic cover 18.

The container 16 is formed of a material which is capable of expanding to accomodate the growth of anodic material during cell discharge, thereby alleviating the above-mentioned problems associated with a large initial void space. Although the selected material must be sturdy enough for desired commercial and industrial applications, less initial void space will be required if the container is flexible and capable of greater expansion.

Suitable materials for the container include electrolyte-resistant plastics such as the following thermoplastic polymers: polystryrene, polyvinyl chloride, modified polystyrene, modified polyvinyl chloride, polysulfone, polyamides, and acetal resin copolymers. By using a clear material, such as polyvinyl chloride, it is possible to observe the progress of the discharge reaction within the cell.

By employing a plastic material, the cell container can be prepared by such inexpensive methods as thermo-forming and blow-molding, although other methods, such as injection-molding, can be utilized as well. Therefore, the container can be easily fabricated in a wide variety of designs suitable for diverse applications.

In addition to the container 16, the case 10 includes a multi-functional metallic cover 18 secured to the container; the cover is also superposed on and in electrical contact with the air cathode 12.

One function the cover performs is to incorporate means for providing ingress of oxygen to the air cathode. Preferably, the cover is provided with air access holes 20 which permit the entrance of air or other oxygen-containing gas into the cell. The size and number of air access holes in the cover can be varied as required for different environmental conditions or intended applications. The holes must be sufficient in size and number to allow adequate air access to the cathode so as not to limit its current capability. However, the cell's performance will also be effected if there are too many and/or too larger air access holes so that excessive loss or gain of water occurs. The cell electrolyte has a relative humidity at a specific level and if exposed to an environment above this level, water vapors will ingress into the cell and be absorbed by the electrolyte, filling the available void volume. If the relative humidity is below this level, moisture is lost. These environmental effects can be limited by discharging the cell soon after the air access holes are exposed.

Figure 2:
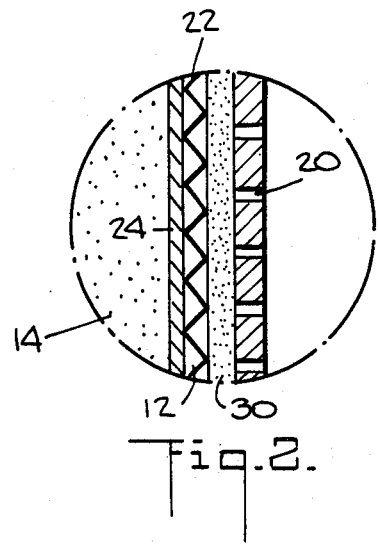
FIG. 2 is an enlarged cross-sectional view of a portion of an air cathode and cover comprising the metal/air electrochemical cell of the invention.

Because the cover is metallic and in electrical contact with the air cathode, it can also function as the positive terminal for the cell. Consequently, the need for additional conductor wires leading from the cathode to the exterior of the cell is eliminated. Preferably, the air cathode 12 is electrically connected to the cover 18 by means of a meshed current collector 22 incorporated into the air cathode, as shown in FIG. 2. By trimming the air cathode to expose the edges of the meshed current collector 22, the meshed current collector can be placed in electrical contact with the cover 18 which thereby functions as a positive terminal for the cell.

The metallic cover 18, which is superposed on the air cathode 12, also functions to support the cathode and prevent it from being distorted by the internal forces created within the cell during discharge. A plastic component of comparable strength would take up a substantially greater volume. Consequently, the size of a metal/air cell according to the invention has been kept to a minimum by the use of a comparatively thin, but strong metallic cover.

Furthermore, because the cover is metallic it can be secured to the container primarily be mechanical crimping to form an electrolyte-tight compressive seal. Since a mechanical seal is employed instead of a solvent or adhesive bond (such as might be required to join two plastic components) the walls of the container can be thin and flexible and yet form a strong, durable seal with the cover. Manufacturing problems which might otherwise be encountered, such as slow set-up of of the adhesive or solvent, pin-holes in the seal, and weak seals, have been avoided with the cell case design of the invention.

Preferably, the cooperating edges of the cover and container are flanged, and the cover and container are sized so that the flanged edges of the cover extend beyond and can be mechanically crimped over the flanged edges of the container, as shown in FIG. 1. The crimped area is then flattened to create an electrolyte-tight compressive seal. Appropriate secondary sealants, such as adhesive rubber cement and bitumen sealing compound, can be applied internally and externally to the seal area between the cover and container. The resultant seal prevents leakage from occurring as the growing discharge product expands against the walls of the cell. Furthermore, oxygen is prevented from flowing around the air cathode to directly oxidize the anode; oxygen can only enter the cell through an air access hole to participate in the electrochemical oxidation of the anode.

Adjacent to the metallic cover is the air cathode 12. Any of a variety of cathode assemblies may be utilized. For example, the air cathode may comprise a porous plate of activated carbon which is rendered hydrophobic by the incorporation of a suitable synthetic polymer, e.g. polytetrafluorethylene or polystyrene, to prevent flooding of the cathode with electrolyte, and restriction of air access to the cathode. Preferably, the air cathode includes a meshed current collector 22 positioned therein, as shown in FIG. 2, electrically connected to the cover. The air cathode is preferably sealed to the cover by impregnating the periphery of the cathode with an adhesive sealant and then pressing the cathode against the cover.

Suitable anode materials for use in the metal/air electrochemical cell of the invention are known in the art. Preferably, the anode is selected from the group consisting of zinc, aluminum, magnesium, or lithium, most preferably zinc. Suitable electrolytes are also well known, e.g. KOH, NaOH, LiOH, and $NH_4OH$, with KOH being most preferred.

In the embodiment shown in FIG. 1, the anode and electrolyte form a mixture 14, preferably of powdered metallic anode in a gelled alkaline electrolyte comprised of an aqueous alkaline hydroxide solution and a suitable gelling agent, such as carboxypolymethylene. Most preferably the mixture comprises powdered zinc in a gelled potassium hydroxide solution.

By varying the concentration of the electrolyte for different environmental relative humidities, environmental effects can be alleviated. Using principles known to those skilled in the art, the ideal cell concentration, at which the water transfer rate into and out of the cell is negligible, can be determined for any relative humidity condition, and vice versa.

The anode/electrolyte mixture is preferably separated from the cathode by a barrier layer 24 which may be attached to, and form an integral part of the air cathode 12, as shown in FIGS. 1 and 2. A wide variety of suitable barrier layer materials are well known, and include, for example, sintered polyvinyl chloride, extruded polyethylene, and polypropylene.

In addition to the embodiment depicted in FIG. 1, the metal/air electrochemical cell of the invention may of course be comprised of separate anode and electrolyte components. For instance, the anode may comprise a layer of powdered metal suspended in a gel, while the electrolyte comprises a separate layer of gelled alkaline electrolyte, the concentration of gelling agent being increased sufficiently to prevent mixing of the two layers. The gelled electrolyte is interposed between the anode and cathode, thereby preventing shorting of the cell. This design is less preferable, however, as the use of a thicker gel reduces the mobility of the electrolyte, resulting in poor low temperature performance and reduced rate capability.

Figure 3:
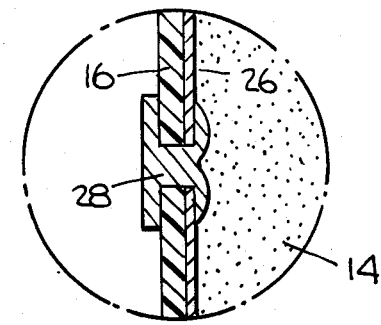
FIG. 3 is an enlarged cross-sectional view of an anode current collector comprising the metal/air electrochemical cell of the invention.

Any of a variety of anode current collectors may be utilized in connection with the metal/air electrochemical cell of the invention. Preferably, as shown in FIGS. 1 and 3, the anode current collector comprises a brass sheet 26 in electrical contact with the anode and sealed against an internal portion of the container with an appropriate sealant, e.g. polystyrene dissolved in toluene, and a semi-tubular rivet 28. The rivet is inserted through a hole punched into the cell case and brass sheet; the tubular walls of the rivet are then rolled back and crimped to the brass sheet. The mechanical seal formed thereby can be fortified against leakage during discharge with appropriate sealant. The head of the rivet, which extends outwardly of the cell case, functions as the negative terminal for the cell.

The metal/air cell may further comprise a diffusion separating pad 30 prepared from a suitable material known in the art, e.g. tetrafluoroethylene, interposed between the air cathode and cover. During discharge, internal pressure created within the cell may force the air cathode so tightly against the cover that transverse dispersion of oxygen through the air access holes to the air cathode is prevented. If only those portions of the air cathode which are in the immediate vicinity of the air access holes are exposed to oxygen, the active air cathode area will be reduced. Consequently, the rate capability of the cell will be diminished. The diffusion pad serves to separate the air cathode from the cover so that the transverse dispersion of oxygen is allowed during discharge.

The amount of initial void space actually required in the cell case will depend in part on the thickness and flexibility of the material used to manufacture the container. The case should include enough initial void space so that the container is capable of expanding to fully accommodate the growth of anodic material during discharge; otherwise cell leakage may occur as a result of internal pressure created within the cell, and/or the voltage of the cell may be suppressed. In any event, the case preferably contains some initial void space so that the container and cover can be easily secured without spillage of electrolyte. Due to gravity, the initial void space will of course be positioned at the top of the cell case.

The invention also pertains to a metal/air battery which includes a metal/air electrochemical cell according to the invention contained within a housing. The housing has means for providing ingress of oxygen to the air cathode.

FIG. 4 portrays a series of four stacked zinc/air cells 32 of the invention electrically connected in series to each other and to the terminals 34 and 36 located on the top of the battery housing 38. As illustrataed in FIG. 5, the battery housing preferably contains air access holes 40, which are positioned in the vicinity of air access holes in the stacked cells which comprise the battery. When not in use, the life of the battery may be prolonged by blocking the air access holes in the battery housing, thereby preventing oxygen from entering the cell and causing discharge.

Although the metal/air cell of the invention is primarily designed for use in lantern devices such as barricade flashers, the cell is also suitable for use in other applications such as military batteries, communication radios, and depth sounders for fishing.

The following example is illustrative, but not in limitation of the present invention.

EXAMPLE

Zinc/air electrochemical cells, having the configuration shown in FIG. 1, and utilizing a polystyrene case having a thickness of 0.030 inches, were constructed to illustrate the present invention. The cells were designed so as to be readily assembled into a 4-cell 6 volt lantern battery.

Twenty five exemplary cells were discharged against a 2.25 ohm continuous load. A typical 4-cell 6 volt lantern battery uses a 9 ohm load. Therefore, the potential performance of a zinc/air battery comprised of four exemplary cells can be derived from the data obtained for the exemplary cells.

The exemplary cells included an initial void space of approximately 10%. This reduced amount of void space (a typical zinc/air button cell requires an initial void space of 17%) was made possible because the flexible plastic container walls were capable of expanding on discharge. During discharge, the container was found to have expanded 10%, corresponding to an approximately 20% growth of anodic material.

The exemplary cells typically averaged 52 ampere-hours to a 0.65 volt endpoint, ranging from 45 to 55 ampere-hours. This is in comparison to commercially available multicell alkaline batteries, which yielded a capacity of about 20 ampere-hours when discharged against a 9 ohm continuous load.

It is to be understood that the invention is in no way limited to the embodiments described and illustrated which are presented by way of example only. In particular, variations are possible, and are contemplated without departing from the framework of the invention.

What is claimed is:

1. A case for enclosing a metal anode, air cathode, and electrolyte of a metal/air electrochemical cell, which comprises: a nonconductive container which is comprised of a thermoplastic, electrolyte-resistant material which is sufficiently flexible to accomodate the growth of anodic material during discharge, and a multi-functional metallic cover secured to the container which has means for providing ingress of oxygen to the air cathode, the cover being sufficiently rigid to prevent distortion of the air cathode during discharge and functioning as the positive terminal of the cell.

2. A case according to claim 1, wherein the plastic material is selected from the group consisting of polystryene, polyvinyl chloride, modified polystyrene, modified polyvinyl chloride, polyamides, polysulfone, and acetal resin copolymers.

3. A case according to claim 2, wherein the plastic material is polystyrene.

4. A case according to claim 1, wherein the container and cover have flanged edges, and wherein the container and cover are secured by mechanically crimping their flanged edges together, and then flattening the crimped area to form an electrolyte-tight, compressive seal.

5. A metal/air electrochemical cell which comprises: a case comprising a nonconductive container which is comprised of a thermoplastic electrolyte-resistant material which is sufficiently flexible to accomodate the growth of anodic material during discharge and a multifunctional metallic cover secured to the container; a metal anode, an air cathode, and an electrolyte disposed in the case, the anode and cathode being separated to prevent shorting of the cell; the cover having means for providing ingress of oxygen to the air cathode, and being superposed on, and in electrical contact with the air cathode, the cover being sufficiently rigid to prevent distortion of the air cathode during discharge and functioning as the positive terminal for the cell.

6. A metal/air electrochemical cell according to claim 5, wherein the anode and cathode are separated by the electrolyte.

7. A metal/air electrochemical cell according to claim 5, wherein the anode and electrolyte form a mixture and the cell further comprises a barrier layer which separates the mixture and cathode.

8. A metal/air electrochemical cell according to claim 5, wherein the plastic material is selected from the group consisting of polystyrene, polyvinyl chloride, modified polystyrene, modified polyvinyl chloride, polyamides, polysulfone, and acetal resin copolymers.

9. A metal/air cell electrochemical cell according to claim 8, wherein the plastic material is polystyrene.

10. A metal/air electrochemical cell according to claim 7, wherein the container and cover have flanged edges, and wherein the container and cover are secured by mechanically crimping their flanged edges together, and then flattening the crimped area to form an electrolyte-tight compressive seal.

11. A metal/air electrochemical cell according to claim 7, wherein an initial void space is disposed within the case.

12. A metal/air electrochemical cell according to claim 7, further comprising a meshed current collector incorporated in the air cathode and providing electrical contact between the air cathode and cover.

13. A metal/air electrochemical cell according to claim 7, further comprising a diffusion pad interposed between the air cathode and cover.

14. A metal/air electrochemical cell according to claim 7, further comprising an anode current collector positioned in contact with the anode and extending outwardly of the container, the outwardly extending portion being the negative terminal of the cell.

15. A metal/air electrochemical cell according to claim 14, wherein the anode current collector comprises a brass sheet sealed against an internal portion of the container, and a brass rivet, one end of the rivet secured to the brass sheet and the other end of the rivet extending ourwardly of the container.

16. A metal/air electrochemical cell according to claim 7, wherein the metal anode is selected from the group consisting of zinc, aluminum, magnesium, or lithium.

17. A metal/air electrochemical cell according to claim 16, wherein the metal anode is zinc.

18. A metal/air electrochemical cell according to claim 7, wherein the electrolyte is selected from the group consisting of KOH, NaOH, LiOH, and NH$_4$OH.

19. A metal/air electrochemical cell according to claim 7, wherein the electrolyte is KOH.

20. A metal/air electrochemical cell according to claim 7, wherein the anode and electrolyte comprise powdered anode in a gelled alkaline electrolyte comprised of a gelling agent and an alkali hydroxide solution.

21. A metal/air electrochemical cell according to claim 20, wherein the anode and electrolyte comprise powdered zinc in a gelled potassium hydroxide solution.

22. A metal/air electrochemical cell according to claim 7, wherein the air cathode is hydrophobic.

23. A metal/air battery which comprises at least one metal/air electrochemical cell according to claim 5, and a housing in which the cell is contained, the housing having means for providing ingress of oxygen to the air cathode.

24. A metal/air battery according to claim 23 which comprises at least two metal/air cells electrically connected to each other.

25. A lantern which comprises a metal/air battery according to claim 23.

* * * * *

UNITED STATES PATENT AND TRADEMARK OFFICE
CERTIFICATE OF CORRECTION

PATENT NO. : 4,687,714
DATED : August 18, 1987
INVENTOR(S) : Oltman, et al.

It is certified that error appears in the above-identified patent and that said Letters Patent is hereby corrected as shown below:

In the ABSTRACT, Line 6, delete "accomodate" and insert --accommodate--.

Col. 2, Line 6, delete "effected" and insert --affected--.
           13, delete "acomodate" and insert --accommodate--.
           21, delete "ac-comodating" and insert --accommodating--.
           45, delete "accomodate" and insert --accommodate--.

Col. 3, Line 63, Delete "accomodate" and insert --accommodate--.

Col. 4, Line 31, delete "effected" and insert --affected--.
           32, delete "larger" and insert --large--.

Col. 7, Line 49, delete "accomodate" and insert --accommodate--.

Col. 8, Line 4, delete "accomodate" and insert --accommodate--.

Signed and Sealed this

Twelfth Day of January, 1988

Attest:

DONALD J. QUIGG

Attesting Officer

Commissioner of Patents and Trademarks